United States Patent
Ryu et al.

(10) Patent No.: US 10,790,478 B2
(45) Date of Patent: Sep. 29, 2020

(54) BATTERY CELL OF IRREGULAR STRUCTURE WITH IMPROVED SEALING RELIABILITY OF CELL CASE

(71) Applicant: LG CHEM, LTD., Seoul (KR)

(72) Inventors: Sang Baek Ryu, Daejeon (KR); Dong Myung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 171 days.

(21) Appl. No.: 15/752,393

(22) PCT Filed: Sep. 12, 2016

(86) PCT No.: PCT/KR2016/010297
§ 371 (c)(1),
(2) Date: Feb. 13, 2018

(87) PCT Pub. No.: WO2017/095002
PCT Pub. Date: Jun. 8, 2017

(65) Prior Publication Data
US 2019/0259979 A1    Aug. 22, 2019

(30) Foreign Application Priority Data
Nov. 30, 2015    (KR) .................. 10-2015-0168607

(51) Int. Cl.
*H01M 2/02*      (2006.01)
*H01M 2/18*      (2006.01)
(Continued)

(52) U.S. Cl.
CPC .......... *H01M 2/0207* (2013.01); *H01M 2/02* (2013.01); *H01M 2/06* (2013.01); *H01M 2/08* (2013.01);
(Continued)

(58) Field of Classification Search
None
See application file for complete search history.

(56) References Cited

U.S. PATENT DOCUMENTS 7,749,648 B2    7/2010  Kim
8,426,057 B2    4/2013  Park et al.
(Continued)

FOREIGN PATENT DOCUMENTS

EP    2849262 A1    3/2015
EP    2927986 A1    10/2015
(Continued)

OTHER PUBLICATIONS

Bowman, Marcus. Sheet Metal Work. The Crowood Press, 2014.*
(Continued)

*Primary Examiner* — Ula C Ruddock
*Assistant Examiner* — Amanda Rosenbaum
(74) *Attorney, Agent, or Firm* — Birch, Stewart, Kolasch & Birch, LLP

(57) ABSTRACT

Disclosed herein is a plate-shaped battery cell including an electrode assembly, which includes a positive electrode, a negative electrode, and a separator, and a cell case, in which the electrode assembly is mounted, outer edges of the cell case being sealed by thermal bonding, wherein the electrode assembly is configured such that each electrode plate having the same polarity is partitioned into at least two electrode parts having different planar shapes and sizes, the electrode assembly is provided at a region thereof at which outer edges of the electrode parts intersect each other with at least one outside corner, at which the outer edges intersect each other at an angle of 30 to 150 degrees, and an outside recess is formed in a region of each of the electrode plates and the separator corresponding to the outer corner such that the outside recess is formed so as to be recessed inward.

20 Claims, 10 Drawing Sheets

(51) Int. Cl.
　　　*H01M 10/04* (2006.01)
　　　*H01M 2/10* (2006.01)
　　　*H01M 2/06* (2006.01)
　　　*H01M 2/08* (2006.01)
　　　*H01M 2/26* (2006.01)
　　　*H01M 10/0585* (2010.01)

(52) U.S. Cl.
　　　CPC ............... *H01M 2/10* (2013.01); *H01M 2/18* (2013.01); *H01M 2/26* (2013.01); *H01M 10/04* (2013.01); *H01M 10/0436* (2013.01); *H01M 10/0585* (2013.01); *H01M 2002/0205* (2013.01)

(56) References Cited

U.S. PATENT DOCUMENTS

| | | | |
|---|---|---|---|
| 8,993,144 B2 | 3/2015 | Kwon et al. | |
| 2007/0196733 A1 | 8/2007 | Lee | |
| 2010/0047685 A1* | 2/2010 | Lee | H01M 2/021 429/176 |
| 2010/0261047 A1* | 10/2010 | Kim | H01M 2/0275 429/144 |
| 2011/0183183 A1 | 7/2011 | Grady et al. | |
| 2011/0274955 A1* | 11/2011 | Park | H01M 2/0212 429/94 |
| 2012/0058387 A1 | 3/2012 | Ahn | |
| 2012/0115020 A1* | 5/2012 | Hwang | H01M 10/049 429/163 |
| 2014/0050959 A1 | 2/2014 | Ryu et al. | |
| 2014/0255739 A1* | 9/2014 | Maleki | H01M 10/0431 429/94 |
| 2015/0037664 A1 | 2/2015 | Kang et al. | |
| 2015/0372353 A1 | 12/2015 | Ryu et al. | |
| 2016/0268557 A1* | 9/2016 | Sohn | H01M 2/026 |
| 2016/0380241 A1* | 12/2016 | Yun | H01M 2/0275 429/144 |
| 2017/0092906 A1 | 3/2017 | Park et al. | |
| 2017/0170437 A1 | 6/2017 | Lee et al. | |

FOREIGN PATENT DOCUMENTS

| | | |
|---|---|---|
| JP | 2000-285881 A | 10/2000 |
| JP | 2001-325993 A | 11/2001 |
| JP | 2003-346798 A | 12/2003 |
| JP | 2005-38613 A | 2/2005 |
| JP | 2006-108097 A | 4/2006 |
| KR | 10-0440934 B1 | 7/2004 |
| KR | 10-2006-0029751 A | 4/2006 |
| KR | 10-0571269 B1 | 4/2006 |
| KR | 10-2011-0105737 A | 9/2011 |
| KR | 10-2013-0119207 A | 10/2013 |
| KR | 10-2013-0124622 A | 11/2013 |
| KR | 10-2013-0133640 A | 12/2013 |
| KR | 10-1462043 B1 | 11/2014 |
| KR | 10-2015-0108731 A | 9/2015 |
| WO | WO 2015/122667 A1 | 8/2015 |
| WO | WO 2015/141920 A1 | 9/2015 |

OTHER PUBLICATIONS

Extended European Search Report, dated Nov. 14, 2018, for European Application No. 16870899.8.

International Search Report for PCT/KR2016/010297 (PCT/ISA/210) dated Dec. 20, 2016.

* cited by examiner

【FIG. 1】
Prior Art
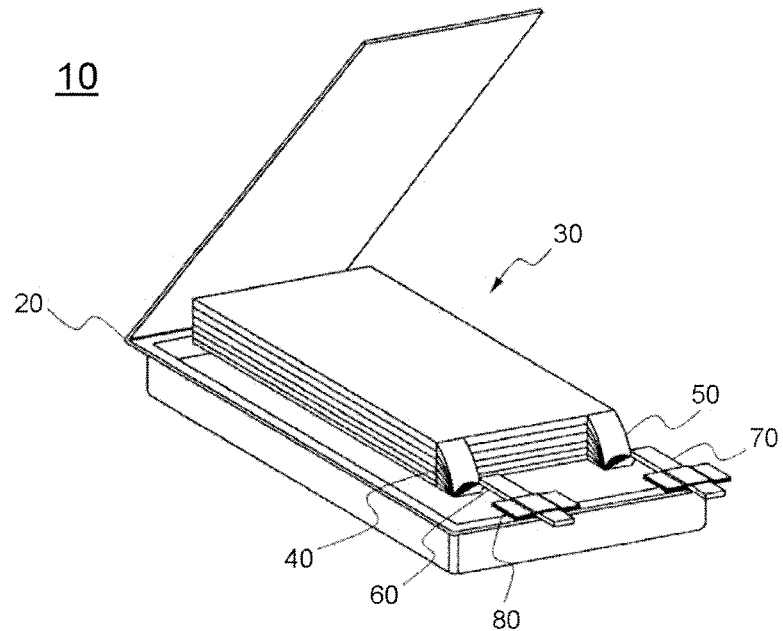
【FIG. 2】
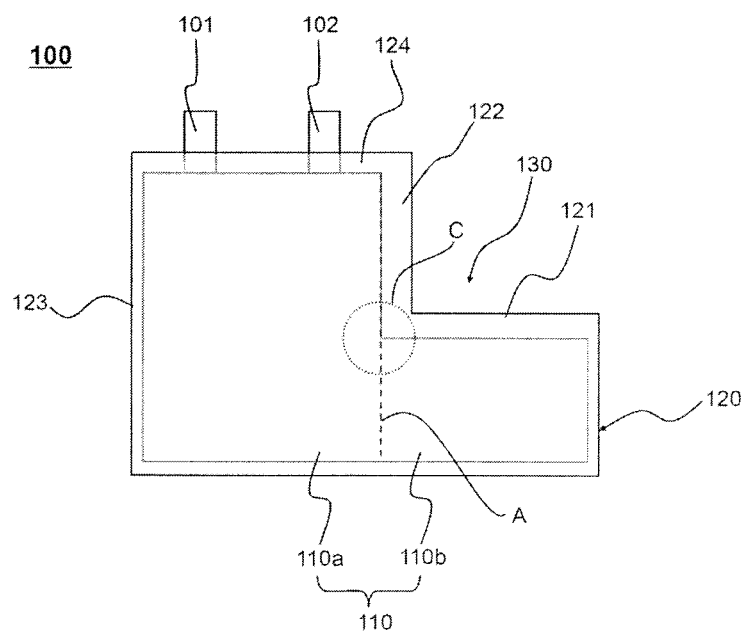

【FIG. 3】
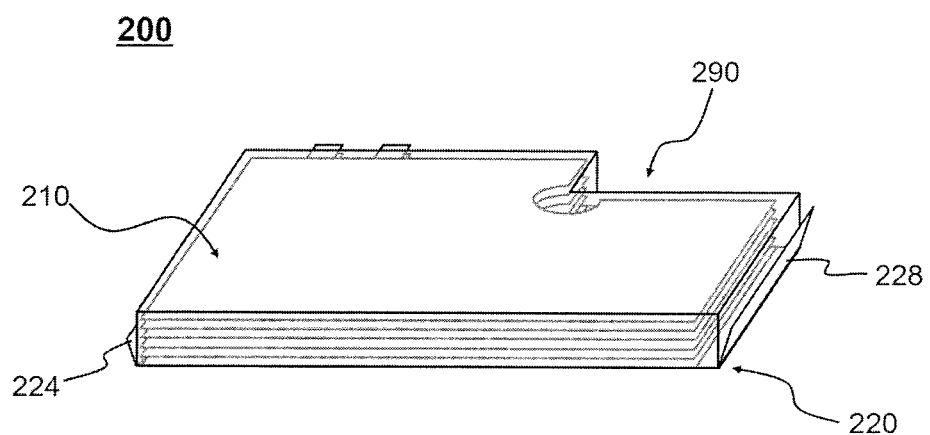
【FIG. 4】
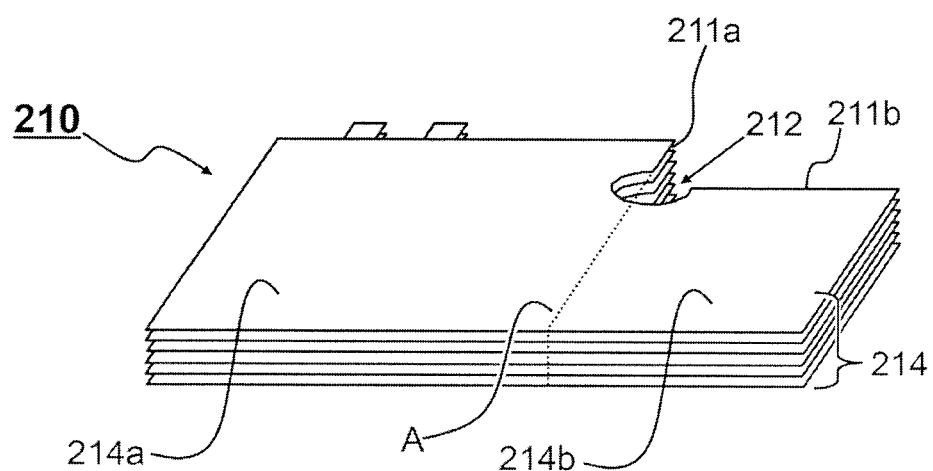

[FIG. 5]
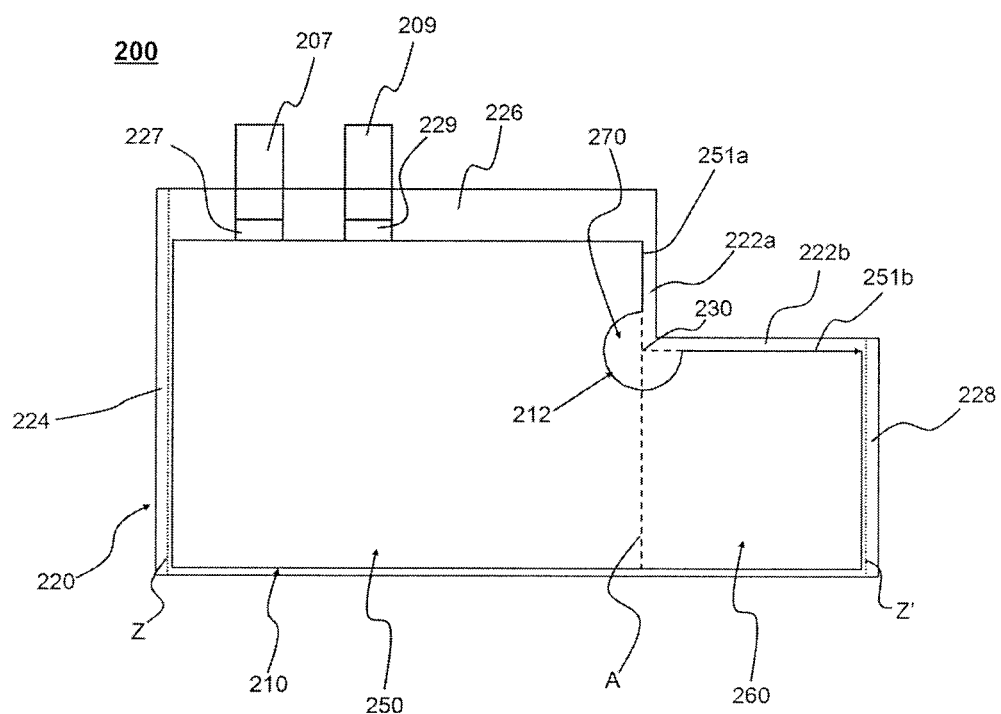

[FIG. 6]
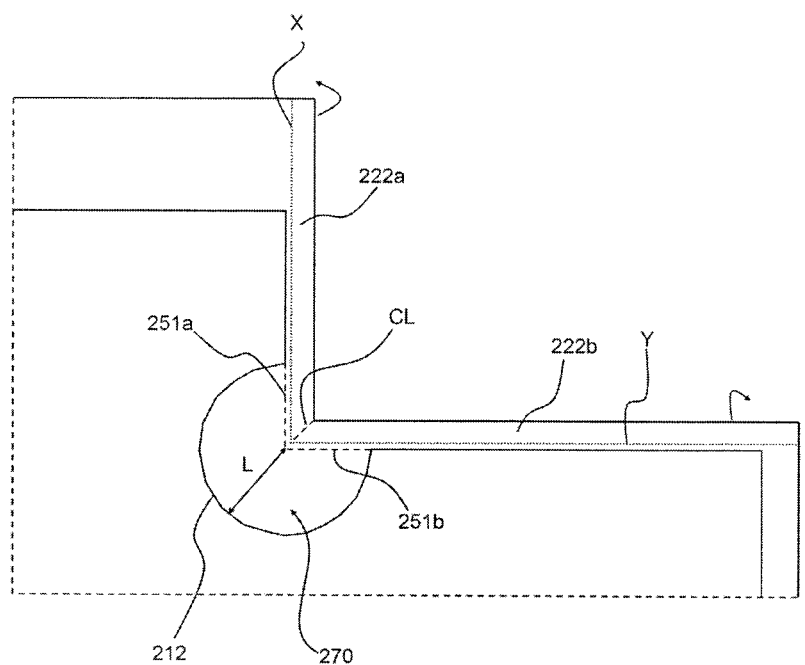

[FIG. 7]
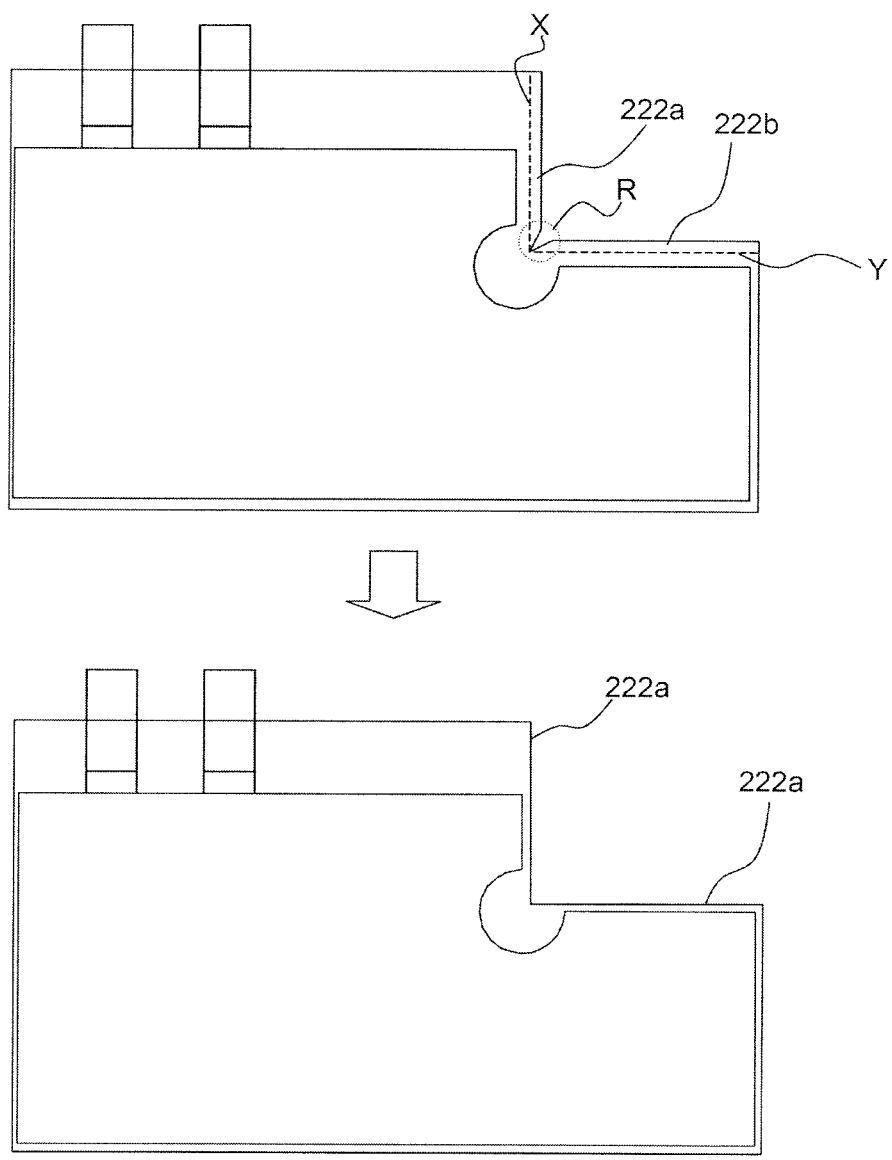

[FIG. 8]
(a) 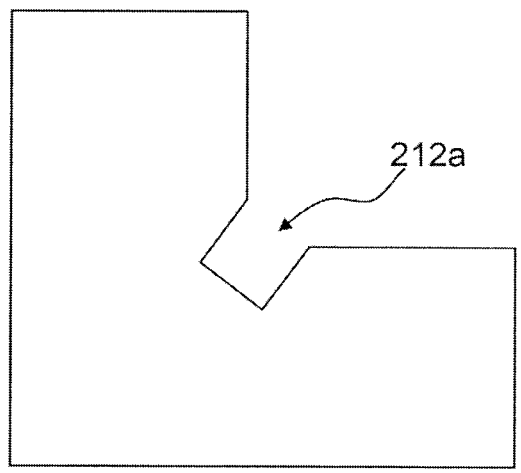
(b) 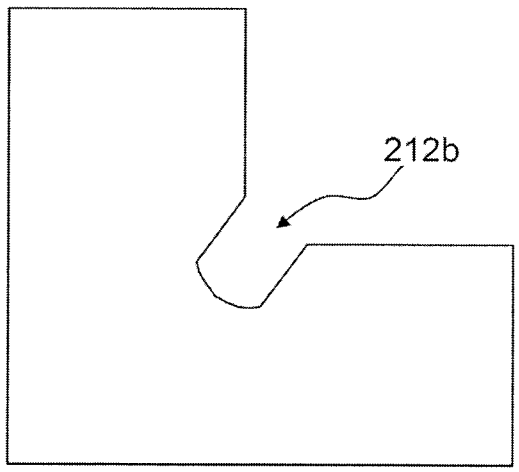

【FIG. 9】
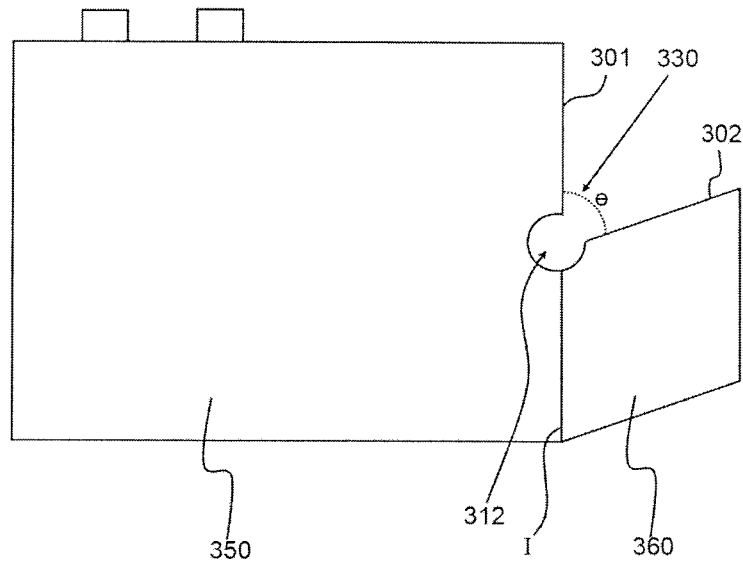
【FIG. 10】
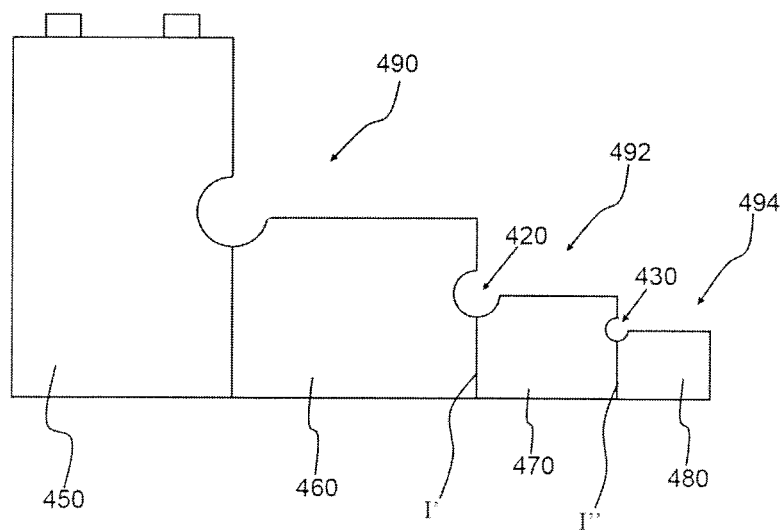

【FIG. 11】
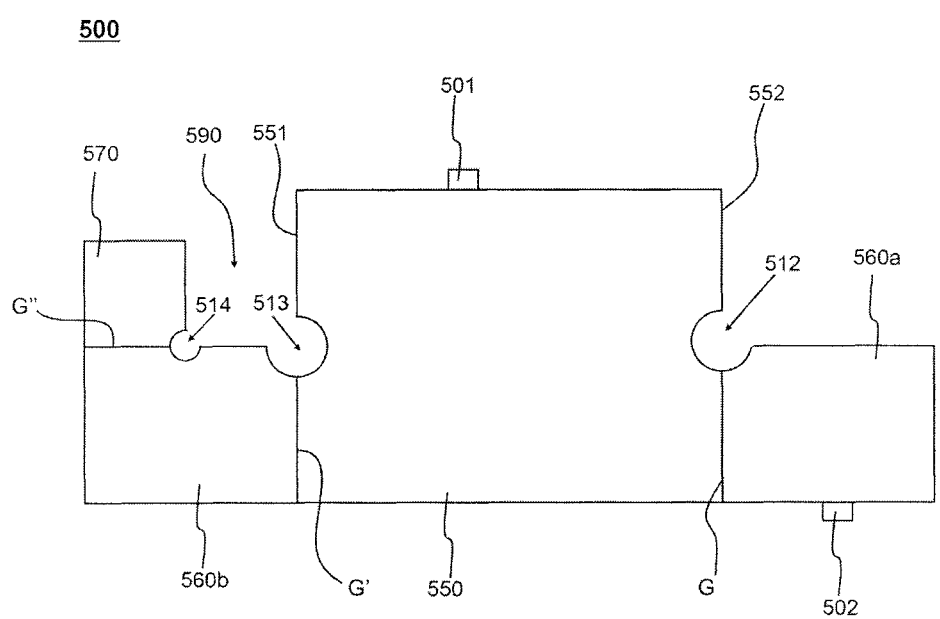

【FIG. 12】
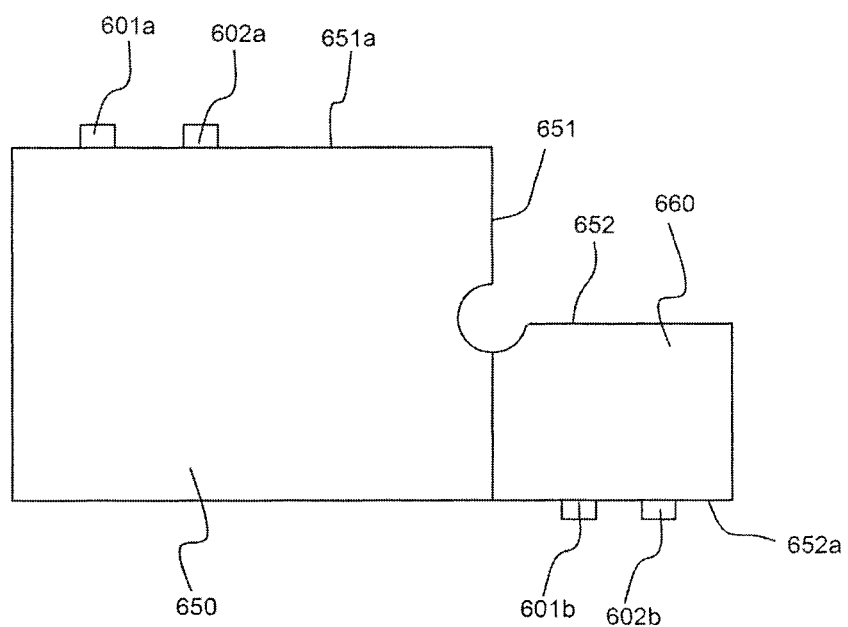

[FIG. 13]
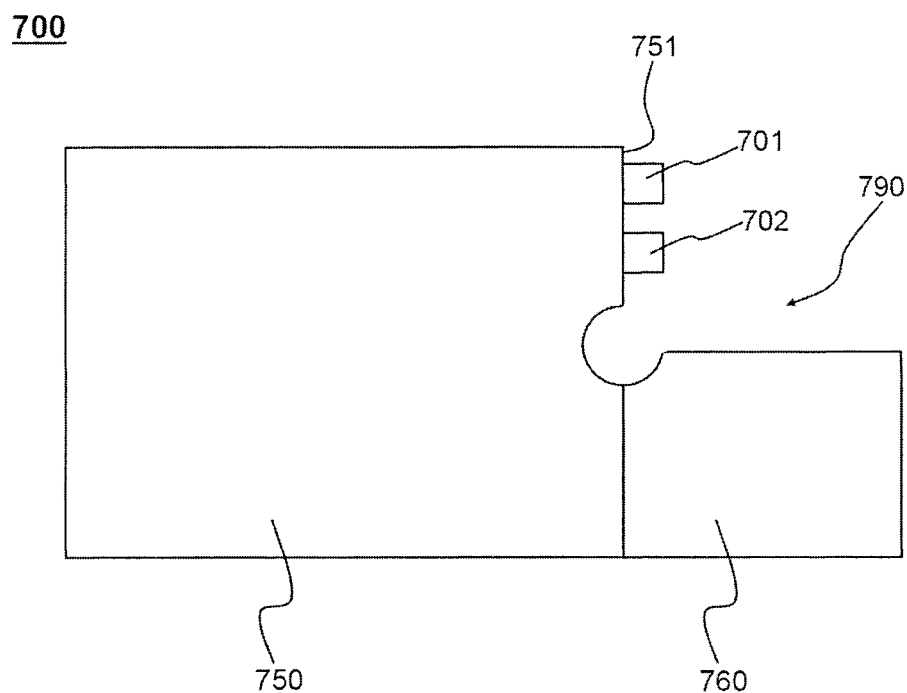

BATTERY CELL OF IRREGULAR STRUCTURE WITH IMPROVED SEALING RELIABILITY OF CELL CASE

TECHNICAL FIELD

This application claims the benefit of Korean Patent Application No. 10-2015-0168607 filed on Nov. 30, 2015 with the Korean Intellectual Property Office, the disclosure of which is herein incorporated by reference in its entirety.

The present invention relates to a battery cell having an irregular structure characterized by improved sealing reliability of a cell case.

BACKGROUND

Based on the appearance thereof, lithium secondary batteries may be generally classified into a cylindrical battery cell, a prismatic battery cell, and a pouch-shaped battery cell. Based on the type of an electrolytic solution, lithium secondary batteries may also be classified into a lithium ion battery, a lithium ion polymer battery, and a lithium polymer battery.

The recent trend toward the miniaturization of mobile devices has increased the demand for a prismatic battery cell or a pouch-shaped battery cell, which has a small thickness. In particular, much interest is currently focused on a pouch-shaped battery cell because it is easy to modify the shape of the pouch-shaped battery cell, the cost of manufacturing the pouch-shaped battery cell is low, and the pouch-shaped battery cell is lightweight.

In general, a pouch-shaped battery cell is a secondary battery having an electrode assembly and an electrolyte contained in a pouch-shaped battery case, which is made of a laminate sheet including a resin layer and a metal layer, in a sealed state. The electrode assembly, which is mounted in the battery case, may be configured to have a jelly-roll (wound) type structure, a stacked type structure, or a combination (stacked/folded) type structure.

FIG. 1 is a view typically showing the structure of a pouch-shaped secondary battery including a stacked type electrode assembly.

Referring to FIG. 1, a pouch-shaped secondary battery 10 includes an electrode assembly 30, electrode tabs 40 and 50 extending from the electrode assembly 30, electrode leads 60 and 70 connected respectively to the electrode tabs 40 and 50 by welding, and a battery case 20 for receiving the electrode assembly 30.

The electrode assembly 30 is a power generating element that includes positive electrodes and negative electrodes sequentially stacked in the state in which separators are disposed respectively between the positive electrodes and the negative electrodes. The electrode assembly 30 is configured to have a stacked type structure or a stacked/folded type structure. The electrode tabs 40 and 50 extend from corresponding electrode plates of the electrode assembly 30. The electrode leads 60 and 70 are electrically connected to the electrode tabs 40 and 50, which extend from the corresponding electrode plates of the electrode assembly 30, respectively, for example, by welding. The electrode leads 60 and 70 are partially exposed outward from the battery case 20. In addition, insulating films 80 for improving sealability between the battery case 20 and the electrode leads 60 and 70 and, at the same time, securing electrical insulation between the battery case 20 and the electrode leads 60 and 70 are attached to portions of the upper and lower surfaces of the electrode leads 60 and 70.

The battery case 20 is made of an aluminum laminate sheet, and has a space for receiving the electrode assembly 30. The battery case 20 is generally formed in a pouch shape. In the stacked type electrode assembly 30 shown in FIG. 1, the inner upper end of the battery case 20 is spaced apart from the electrode assembly 30 such that the electrode tabs 40 and 50 can be coupled to the electrode leads 60 and 70, respectively.

Recently, however, a new battery cell type is required according to trends toward a slim type and various designs.

In addition, the battery cells are configured to include electrode assemblies having the same size or capacity. In order to manufacture a battery cell having a novel structure considering the design of a device to which the battery cell is applied, therefore, the capacity of the battery cell should be decreased, or the device size should be increased.

In order to solve such problems, some prior technologies manufacture a battery pack by stacking different-sized battery cells. However, since such a battery pack has stacked battery cells, the battery cells do not share electrochemical reaction therebetween, and the thickness of the battery pack is consequently increased. As a result, the capacity of the battery may be decreased.

In addition, due to such design modification, electrical connection becomes complex; therefore, it is difficult to manufacture a battery cell satisfying desired conditions.

Therefore, there is a high necessity for a battery cell that is capable of being easily adapted to the shape of a device to which the battery cell is to be applied.

Technical Problem

The present invention has been made to solve the above problems and other technical problems that have yet to be resolved.

Specifically, it is an object of the present invention to provide a battery cell that is configured to have a structure that is capable of being easily adapted to the shapes and spaces of various devices in order to maximally utilize the spaces in the devices and is configured to have a structure that is capable of being effectively mounted in devices having various structures other than a rectangular structure.

Technical Solution

In accordance with one aspect of the present invention, the above and other objects can be accomplished by the provision of a plate-shaped battery cell including an electrode assembly, which includes a positive electrode, a negative electrode, and a separator, and a cell case, in which the electrode assembly is mounted, outer edges of the cell case being sealed by thermal bonding, wherein the electrode assembly is configured such that each electrode plate having the same polarity is partitioned into at least two electrode parts having different planar shapes and sizes, the electrode assembly is provided at a region thereof at which outer edges of the electrode parts intersect each other with at least one outside corner, at which the outer edges intersect each other at an angle of 30 to 150 degrees, and an outside recess is formed in a region of each of the electrode plates and the separator corresponding to the outer corner such that the outside recess is formed so as to be recessed inward.

That is, the battery cell according to the present invention is configured such that the electrode assembly includes electrode parts having different shapes and sizes. As a result, the battery cell may be configured to have a new structure quite different from a general rectangular structure. For example, the battery cell may be configured to have an irregular structure such as a stepped or recessed structure based on the difference in size between the electrode parts or a geometrical structure based on the difference in shape between the electrode parts. Consequently, the battery cell according to the present invention may be easily adapted to the shapes of devices having various designs.

An example of such an irregular structure is shown in FIG. 2. The irregular structure will be described in more detail with reference to FIG. 2.

Referring to FIG. 2, a battery cell 100 is configured to have a structure in which outer edges 121, 122, 123, and 124 of a cell case 120 are sealed by thermal bonding in the state in which an electrode assembly 110 is received in the cell case 120 together with an electrolyte.

Specifically, the electrode assembly 110 includes two electrode parts 110a and 110b having different planar shapes and sizes, which are partitioned from each other by a boundary line A. As a result, a step 130 is formed at the electrode assembly 110 due to the differences in size between the electrode parts 110a and 110b. In addition, the cell case 120 is formed in a shape corresponding to that of the electrode assembly 110, and the outer edges 121, 122, 123, and 124 of the cell case 120 are sealed along the outer edges of the electrode assembly 110. Consequently, the battery cell 100 is configured in an irregular structure including the step 130, which corresponds to the shape of the electrode assembly 110, rather than a conventional rectangular structure In the structure of the battery cell 100 shown in FIG. 2, however, the outer edges 121 and 122 of the cell case 120 intersect each other at an outside corner C, which is a region at which the outer edges of the electrode 110a and 110b intersect each other, such that the shape of the cell case 120 corresponds to that of the electrode assembly. As a result, the sealed area at the region at which the outer edges 121 and 122 of the cell case 120 intersect each other is relatively large.

In addition, the sealed region at which the outer edges 121 and 122 of the cell case 120 intersect each other has lower sealing force than the other edges of the cell case. For this reason, the outer edges 121 and 122 of the cell case 120, which are adjacent to the outside corner C, require that a larger area be sealed by thermal bonding than the other outer edges 123 and 124 of the cell case 120.

As a result, the structure of the battery cell 100 has a disadvantage in that the utilization of the battery cell in the space in a device is deteriorated in proportion to the sealed area of the outer edges 121 and 122 of the cell case 120 at the outside corner C.

In addition, the outer edges 121, 122, and 123 of the cell case 120, which are sealed by thermal bonding, must be bent in the lateral direction of the electrode assembly 110, excluding the outer edge 124, at which electrode leads 101 and 102 are formed, in order to prevent the penetration of moisture into the cell case therethrough and to reduce the area of the battery cell. In the structure shown in FIG. 2, however, the outer edges 121 and 122 of the cell case 120, which are adjacent to the outside corner C, are connected to each other so as to correspond to the outside corner C. For this reason, it is not easy to bend the outer edges 121, 122, and 123 of the cell case 120 in the lateral direction of the electrode assembly 110.

If the connection between the outer edges 121, 122, and 123 of the cell case 120 is cut in order to bend the outer edges 121, 122, and 123 of the cell case 120, the sealed region of the cell case 120 is not provided between the outside corner C and the cut region, with the result that the sealed state of the cell case 120 may be compromised.

In the battery cell according to the present invention, an outside recess is formed in a region of each of the electrode plates and the separator such that the outside recess is formed so as to be recessed inward, the outside recess is formed at the outer corner, and the cell case is further sealed by thermal bonding in the outside recess, thereby improving the sealing reliability of the cell case.

As described above, the outside recess is a region formed so as to be recessed inward in each of the electrode plates and the separator. When the electrode plates and the separator are stacked to constitute the electrode assembly, the outside recesses may be arranged parallel to each other in the upward-downward direction.

The electrode assembly may include at least two electrode parts, and the outside recess may be formed between the electrode parts. Specifically, the outside recess may be formed so as to correspond to the outside corner. That is, the outside recesses arranged parallel to each other in the upward-downward direction may be located at the outer corner.

In the above structure, the cell case may be further sealed at a position thereof corresponding to the outside recess by thermal bonding so as to have an area corresponding to the area of the outside recess. Consequently, it is possible to improve the sealability of the outside corner of the electrode assembly, which has low sealing force.

The cell case may include sealed outer edges sealed along the outer edges of the electrode assembly in parallel therewith by thermal bonding, excluding the outside recess and a sealed extension sealed by thermal bonding at a position corresponding to the outside recess.

Consequently, it is possible to reduce the sealed area at the region at which the sealed outer edges adjacent to the outside recess intersect each other by the provision of the sealed extension further formed by thermal bonding in the outside recess. In addition, it is also possible to reduce the sealed area of the sealed outer edges, whereby the battery cell may maximally utilize the space in a device.

The sealed outer edges of the battery cell may also be bent in the lateral direction of the electrode assembly, and the sealed outer edges adjacent to the outside recess, among the bent sealed outer edges, may be bent in the state in which the connection between the sealed outer edges is cut toward the sealed extension.

Even when the connection between the sealed outer edges is cut as described above, it is possible to securely maintain the sealed state of the cell case at the outside corner of the electrode assembly thanks to the sealed extension, which is further formed by thermal bonding in the outside recess. Consequently, it is possible to easily bend the outer edges of the cell case in the lateral direction of the electrode assembly even though the battery cell according to the present invention has an irregular structure as described above.

In a concrete example, when viewed from above, the outside recess may have a rounded structure including a curved line, a composite structure including a curved line and a straight line connected to each other, or a polygonal structure including a plurality of straight lines connected to each other.

The maximum length by which the outside recess is recessed inward may be 20 to 400% the average of the widths of the sealed outer edges adjacent to the outside recess.

Here, the maximum length is a length corresponding to the maximum distance by which the outside recess is recessed inward from the point at which the outer edges of the electrode parts intersect each other. The maximum length is proportional to the sealed area of the sealed extension.

In addition, the area of the sealed outer edges adjacent to the outside recess may be reduced in proportion to the increase in the area of the sealed extension. Consequently, the maximum length may be set based on the average of the widths of the sealed outer edges.

If the maximum length of the outside recess is less than the minimum value of the above range, the sealed area of the sealed extension is small, with the result that desired effects cannot be achieved. If the maximum length of the outside recess is greater than the maximum value of the above range, the volume of the electrode assembly is reduced due to the inward recess, with the result that the capacity of the battery cell is reduced, which is not desirable.

Hereinafter, various irregular structures of the electrode assembly will be described in detail based on non-limiting examples.

In a concrete example, at the outside corner, the outer edges of the electrode parts may intersect each other at a predetermined angle based on a desired shape of the electrode assembly. Specifically, at the outside corner, the outer edges of the electrode parts may intersect each other at an angle of 60 to 120 degrees.

The electrode assembly may be configured to have a structure in which at least one positive electrode plate including electrode parts and an outside recess and at least one negative electrode plate including electrode parts and an outside recess are stacked upward in the state in which a separator is disposed between the positive electrode plate and the negative electrode plate. The electrode assembly having this structure may be referred to as a stacked type electrode assembly.

On the other hand, the electrode assembly may be configured to have a structure in which a plurality of unit cells, each of which is configured to have a structure in which at least one positive electrode plate including electrode parts and an outside recess and at least one negative electrode plate including electrode parts and an outside recess are stacked upward in the state in which a separator is disposed between the positive electrode plate and the negative electrode plate, is arranged on a separation film, the separation film being wound from one end to the other end thereof such that the unit cells are stacked in the state in which the separation film is disposed between the respective unit cells. The electrode assembly having this structure may be referred to as a combination (stacked/folded) type electrode assembly.

The electrode assembly, which is constituted by the electrode plates and the separators, may include a first electrode part having a relatively large planar size and at least one second electrode part having a planar size smaller than the planar size of the first electrode part, the second electrode part extending perpendicularly from a boundary line of the first electrode part in the state of being integrally formed with the first electrode part, and the outside recess may be formed in an outside corner at which the boundary line of the first electrode part and an extension region of the second electrode part are perpendicular to each other.

In the present invention, the first electrode part and the second electrode part are regions of the electrode assembly that are partitioned from each other about the imaginary boundary line such that the first electrode part and the second electrode part have different planar shapes and sizes in the state in which the electrode plates are stacked. That is, the electrode parts are not physically divided from each other.

For example, in each electrode plate having the same polarity, at least two electrode parts having different planar shapes and sizes may extend from each other in the state of being integrally formed with each other.

Consequently, in the case in which a positive electrode plate is partitioned into first and second electrode parts having different planar shapes and sizes and a negative electrode plate is partitioned into first and second electrode parts having different planar shapes and sizes, the first electrode part of the positive electrode plate and the first electrode part of the negative electrode plate are arranged parallel to each other in the upward-downward direction to constitute a first electrode part of the electrode assembly and the second electrode part of the positive electrode plate and the second electrode part of the negative electrode plate are arranged parallel to each other in the upward-downward direction to constitute a second electrode part of the electrode assembly, when the positive electrode plate and the negative electrode plate are stacked.

The electrode assembly may further include n (n≥1) extension electrode parts having planar sizes smaller than the planar size of the first electrode part or the second electrode part, one of the extension electrode parts, i.e. a first extension electrode part, may extend perpendicularly from a boundary line of the first electrode part or the second electrode part in the state of being integrally formed with the first electrode part or the second electrode part, and an outside recess may be formed in an outside corner at which the boundary line and the first extension electrode part are perpendicular to each other.

When n is equal to or greater than 2, the extension electrode parts may extend perpendicularly from a boundary line of an adjacent (n−1)-th extension electrode part in the state of being integrally formed with the (n−1)-th extension electrode part while forming an outside recess.

Electrode tabs may be formed at various positions of the electrode assembly such that the electrode assembly can be electrically connected to the outside in various ways.

In a concrete example, one electrode tab may be formed at each of the first electrode part and the second electrode part.

The electrode tab may be a positive electrode tab or a negative electrode tab, and the positive electrode tab may be formed at the first electrode part. In the above structure, the positive electrode tab may be formed at the first electrode part, and the negative electrode tab may be formed at the second electrode part. Alternatively, the positive electrode tab may be formed at the second electrode part, and the negative electrode tab may be formed at the first electrode part.

The electrode tab may be formed at the outer edge of the electrode part that is not adjacent to the outer corner. In this structure, the sealed outer edges of the cell case that are adjacent to the outer recess may be bent in the lateral direction of the electrode assembly, as described above.

Alternatively, the electrode tab may be formed at the outer edge of each of the electrode parts that is adjacent to the outer corner. In this structure, the sealed outer edges of the cell case that are adjacent to the outer recess may not be bent in the lateral direction of the electrode assembly.

In another concrete example, electrode tabs, i.e. a positive electrode tab and a negative electrode tab, may be formed at each of the first electrode part and the second electrode part, and the electrode tabs may be formed at the outer edges of the electrode parts, excluding the outer edges of the electrode parts that are adjacent to the outer corner.

In the above structure, the positive electrode tab and the negative electrode tab are formed at each electrode part. Consequently, each electrode part may be electrically connected to an external device. In addition, current may be distributed through the electrode tabs of the first electrode part and the second electrode part. Consequently, the resistance in the respective electrode tabs is lowered, with the result that current loss is reduced.

In a further concrete example, electrode tabs may be formed at the first electrode part or the second electrode part, and the electrode tabs may be formed at the outer edges of the electrode part, excluding the outer edges of the electrode part that are adjacent to the outer corner.

In addition, electrode tabs may be formed at the first electrode part or the second electrode part, and the electrode tabs may be formed at the outer edges of the electrode part that are adjacent to the outer corner.

The battery cell may be configured to have a structure in which electrode leads protrude outward from the cell case through portions of the outer edges of the cell case sealed by thermal bonding in the state in which the electrode leads are coupled to the electrode tabs.

As described above, the battery cell may be an irregular battery cell configured to have a structure in which six or more outer edges of the battery cell are connected so as to define one or more steps, and the outer edges of the battery cell may correspond to the outer edges of the cell case sealed by thermal bonding.

The cell case may be a pouch-shaped battery case made of a laminate sheet including a resin layer and a metal layer.

The laminate sheet may be configured to have a structure in which an outer resin layer exhibiting high durability is attached to one major surface (the outer surface) of a metal blocking layer and a resin sealant layer exhibiting a high thermal bonding property is attached to the other major surface (the inner surface) of the metal blocking layer.

It is required for the outer resin layer to exhibit high resistance to the external environment. Consequently, it is required for the outer resin layer to exhibit more than predetermined tensile strength and weather resistance. For this reason, the outer resin layer may be made of a polymer resin, such as polyethylene terephthalate (PET) or oriented nylon film.

It is required for the metal blocking layer to have a function of increasing the strength of the cell case in addition to a function of preventing the introduction or leakage of foreign matter, such as gas or moisture. To this end, the metal blocking layer may be made of, for example, aluminum.

The resin sealant layer may be made of a polyolefin resin which exhibits a high thermal welding property (thermal adhesive property) and a low hygroscopic property, which is necessary to restrain the permeation of an electrolyte, and is not expanded or is not corroded by the electrolyte. More specifically, the resin sealant layer may be made of cast polypropylene (CPP).

In general, a polyolefin resin, such as polypropylene, has low adhesion to metal. For this reason, an adhesive layer may be further disposed between the resin sealant layer and the metal blocking layer so as to improve adhesion between the resin sealant layer and the metal blocking layer and to improve blocking characteristics. The adhesive layer may be made of, for example, urethane, acryl, or thermoplastic elastomer, to which, however, the material for the adhesive layer is not limited.

The cell case may be configured to have a structure in which resin layers of the laminate sheet are joined to each other by thermal bonding in the state in which the resin layers are in tight contact with each other so as to face each other. Consequently, it is possible to seal the electrode assembly and the electrolyte from the outside. The outer edges of the cell case may outer regions of the cell case that ate bonded to each other as described above.

The kind of the battery cell according to the present invention is not particularly restricted. In a concrete example, the battery cell may be a lithium secondary battery, such as a lithium ion (Li-ion) battery, a lithium polymer (Li-polymer) battery, or a lithium ion polymer (Li-ion polymer) battery, which exhibits high energy density, discharge voltage, and output stability.

In general, a lithium secondary battery includes a positive electrode, a negative electrode, a separator, and a non-aqueous electrolytic solution containing lithium salt.

The positive electrode may be manufactured, for example, by applying a mixture of a positive electrode active material, a conductive agent, and a binder to a positive electrode current collector and/or a positive electrode current collecting extension and drying the mixture. A filler may be further added to the mixture as needed.

In general, the positive electrode current collector and/or the positive electrode current collecting extension has a thickness of 3 to 500 μm. The positive electrode current collector and/or the positive electrode current collecting extension is not particularly restricted so long as the positive electrode current collector and/or the positive electrode current collecting extension exhibits high conductivity while the positive electrode current collector and/or the positive electrode current collecting extension does not induce any chemical change in a battery to which the positive electrode current collector and/or the positive electrode current collecting extension is applied. For example, the positive electrode current collector and/or the positive electrode current collecting extension may be made of stainless steel, aluminum, nickel, titanium, or plastic carbon. Alternatively, the positive electrode current collector and/or the positive electrode current collecting extension may be made of aluminum or stainless steel, the surface of which is treated with carbon, nickel, titanium, or silver. In addition, the positive electrode current collector and/or the positive electrode current collecting extension may have a micro-scale uneven pattern formed at the surface thereof so as to increase the adhesive force of the positive electrode active material. The positive electrode current collector and/or the positive electrode current collecting extension may be configured in various forms, such as a film, a sheet, a foil, a net, a porous body, a foam body, and a non-woven fabric body.

The positive electrode active material may be, but is not limited to, a layered compound, such as a lithium cobalt oxide ($LiCoO_2$) or a lithium nickel oxide ($LiNiO_2$), or a compound replaced by one or more transition metals; a lithium manganese oxide represented by a chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; an Ni-sited lithium nickel oxide represented by a chemical formula $LiNi_{1-x}M_xO_2$ (where M=Co, Mn, Al, Cu, Fe, Mg, B, or Ga, and x=0.01 to 0.3); a lithium manganese composite oxide represented by a chemical formula $LiMn_{2-x}M_xO_2$ (where M=Co, Ni, Fe, Cr, Zn, or Ta, and x=0.01 to 0.1) or a chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent has 1 to 30 weight % based on the total weight of the compound including the positive electrode active material. The conductive agent is not particularly restricted so long as the conductive agent exhibits high conductivity while the conductive agent does not induce any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or conductive materials, such as polyphenylene derivatives may be used as the conductive agent.

The binder is a component assisting in binding between the active material and the conductive agent and in binding with the current collector. The binder is generally added in an amount of 1 to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler so long as it does not cause chemical changes in a battery to which the filler is applied and is made of a fibrous material. As examples of the filler, there may be used olefin polymers, such as polyethylene and polypropylene; and fibrous materials, such as glass fiber and carbon fiber.

The negative electrode may be manufactured by applying and drying a negative electrode active material to a negative electrode current collector and/or negative electrode current collecting extension. The above-described components may be selectively added to the negative electrode active material as needed.

In general, the negative electrode current collector and/or the negative electrode current collecting extension has a thickness of 3 to 500 µm. The negative electrode current collector and/or the negative electrode current collecting extension is not particularly restricted so long as the negative electrode current collector and/or the negative electrode current collecting extension exhibits high conductivity while the negative electrode current collector and/or the negative electrode current collecting extension does not induce any chemical change in a battery to which the negative electrode current collector and/or the negative electrode current collecting extension is applied. For example, the negative electrode current collector and/or the negative electrode current collecting extension may be made of copper, stainless steel, aluminum, nickel, titanium, or plastic carbon. Alternatively, the negative electrode current collector and/or the negative electrode current collecting extension may be made of copper or stainless steel, the surface of which is treated with carbon, nickel, titanium, or silver, or an aluminum-cadmium alloy. In addition, the negative electrode current collector and/or the negative electrode current collecting extension may have a micro-scale uneven pattern formed at the surface thereof so as to increase the adhesive force of the negative electrode active material, in the same manner as the positive electrode current collector and/or the positive electrode current collecting extension. The negative electrode current collector and/or the negative electrode current collecting extension may be configured in various forms, such as a film, a sheet, a foil, a net, a porous body, a foam body, and a non-woven fabric body.

As the negative electrode active material, for example, there may be used carbon, such as a non-graphitizing carbon or a graphite-based carbon; a metal composite oxide, such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, Group 1, 2 and 3 elements of the periodic table, halogen; $0 \le x \le 1$; $1 \le y \le 3$; $1 \le z \le 8$); lithium metal; lithium alloy; silicon-based alloy; tin-based alloy; metal oxide, such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, or $Bi_2O_5$; conductive polymer, such as polyacetylene; or a Li—Co—Ni based material.

The separator is interposed between the positive electrode and the negative electrode. As the separator, for example, an insulative thin film exhibiting high ion permeability and high mechanical strength may be used. The separator generally has a pore diameter of 0.01 to 10 µm and a thickness of 5 to 300 µm. As the material for the separator, for example, a sheet or non-woven fabric made of olefin polymer, such as polypropylene, which exhibits chemical resistance and hydrophobicity, glass fiber, or polyethylene is used. In the case in which a solid electrolyte, such as polymer, is used as an electrolyte, the solid electrolyte may also function as the separator.

The electrolytic solution may be a non-aqueous electrolytic solution containing lithium salt, which is composed of a non-aqueous electrolytic solution and lithium salt. A non-aqueous organic solvent, an organic solid electrolyte, or an inorganic solid electrolyte may be used as the non-aqueous electrolytic solution. However, the present invention is not limited thereto.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the above-mentioned non-aqueous electrolyte, and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. According to circumstances, in order to impart incombustibility, the non-aqueous electrolytic solution may further include halogen-containing solvents, such as carbon tetrachloride and ethylene trifluoride. Furthermore, in order to improve high-temperature retention characteristics, the non-aqueous electrolytic solution may further include carbon dioxide gas. Moreover, fluoro-ethylene carbonate (FEC) and propene sultone (PRS) may be further included.

In a preferred example, lithium salt, such as $LiPF_6$, $LiClO_4$, $LiBF_4$, or $LiN(SO_2CF_3)_2$, may be added to a mixed solvent of cyclic carbonate, such as EC or PC, which is a high dielectric solvent, and liner carbonate, such as DEC, DMC, or EMC, which is a low viscosity solvent, to prepare a non-aqueous electrolyte containing lithium salt.

In accordance with other aspects of the present invention, there are provided a battery pack including one or more battery cells and a device including the battery pack.

The device is not particularly restricted as long as the device is an electronic device that requires power from the battery pack. Specifically, the device may be a mobile electronic device having a relatively small space in which the battery pack is installed. For example, the mobile electronic device may include, but is not limited to, a mobile phone, a smart phone, a tablet computer, a laptop computer, a smart watch, smart glasses, smart clothes, or a smart band.

BRIEF DESCRIPTION OF DRAWINGS

The above and other objects, features and other advantages of the present invention will be more clearly understood from the following detailed description taken in conjunction with the accompanying drawings, in which:

FIG. 1 is a typical view showing a conventional battery cell;

FIG. 2 is a typical view showing another conventional battery cell;

FIG. 3 is a typical view showing a battery cell according to an embodiment of the present invention;

FIG. 4 is a typical view showing an electrode assembly constituting the battery cell of FIG. 3;

FIG. 5 is a plan view typically showing the battery cell of FIG. 3;

FIG. 6 is a partially enlarged view typically showing the battery cell of FIG. 5;

FIG. 7 is a typical view showing a series of processes in which sealed outer edges shown in FIG. 6 are bent along cutting lines;

FIG. 8 is a typical view showing the structures of outside recesses according to another embodiment of the present invention;

FIG. 9 is a typical view showing an electrode assembly according to another embodiment of the present invention;

FIG. 10 is a typical view showing an electrode assembly according to another embodiment of the present invention;

FIG. 11 is a typical view showing an electrode assembly according to another embodiment of the present invention;

FIG. 12 is a typical view showing an electrode assembly according to another embodiment of the present invention; and FIG. 13 is a typical view showing an electrode assembly according to a further embodiment of the present invention.

DETAILED DESCRIPTION OF THE EMBODIMENTS

Now, exemplary embodiments of the present invention will be described in detail with reference to the accompanying drawings. It should be noted, however, that the scope of the present invention is not limited by the illustrated embodiments.

FIG. 3 is a typical view showing a battery cell according to an embodiment of the present invention, FIG. 4 is a view typically showing an electrode assembly constituting the battery cell of FIG. 3, and FIG. 5 is a plan view showing the battery cell of FIG. 3. In addition, FIG. 6 is a partially enlarged view typically showing the battery cell of FIG. 5.

Referring to these figures, a battery cell 200 is configured to have a structure in which outer edges 222a, 222b, 224, 226, and 228 of a cell case 220 are sealed by thermal bonding in the state in which an electrode assembly 210 is received in the cell case 220 together with an electrolyte.

The electrode assembly 210 is configured to have a structure in which a plurality of electrode plates 214, which includes a plurality of positive electrode plates and negative electrode plates, is stacked upward in the state in which separators (not shown) are disposed between the respective electrode plates 214.

The separators and the electrode plates 214 each include two electrode parts 214a and 214b having different planar shapes and sizes, which are partitioned from each other by a boundary line A. An outside recess 212 is formed in a region of each of the separators and electrode plates 214 at which outer edges 211a and 211b of the electrode parts 214a and 214b intersect each other such that the outside recess is formed so as to be recessed inward.

Consequently, a recessed space, which is defined by the outside recesses 212, which are arranged parallel to each other in the upward-downward direction, is formed in the electrode assembly 210, which is constituted by the electrode plates 214 and the separators, which are stacked, such that the cell case 220 may be further sealed by thermal bonding in the recessed space.

The electrode assembly 210, which is configured such that the electrode plates 214 and the separators, each of which includes two electrode parts 214a and 214b, includes a first electrode part 250 having a relatively large planar size and a second electrode part 260 having a planar size smaller than that of the first electrode part 250, the second electrode part 260 extending perpendicularly from an imaginary boundary line A that extends from an outer edge 251a of the first electrode part 250 in the state of being integrally formed with the first electrode part 250.

The first electrode part 250 and the second electrode part 260 are regions of the electrode assembly that are partitioned from each other about the imaginary boundary line A such that the first electrode part 250 and the second electrode part 260 have different planar shapes and sizes in the state in which the electrode plates 214 are stacked. That is, the electrode parts 250 and 260 are not physically divided from each other. Furthermore, the electrode parts 250 and 260 are not separated from each other.

In addition, when the positive electrode plates and the negative electrode plates, each of which is partitioned into the first and second electrode parts 214a and 214b having different planar shapes and sizes, are stacked, the first electrode parts 214a of the positive electrode plates and the negative electrode plates are arranged parallel to each other in the upward-downward direction to constitute the first electrode part 250 of the electrode assembly 210. In the same manner, the second electrode parts 214b of the positive electrode plates and the negative electrode plates are arranged parallel to each other in the upward-downward direction to constitute the second electrode part 260 of the electrode assembly 210. Consequently, the electrode parts 214a and 214b of the electrode plates 214 are substantially the same as the electrode parts 250 and 260 of the electrode assembly 210, respectively.

The electrode assembly 210 is provided at a region thereof at which the outer edge 251a of the first electrode part 250 and an outer edge 251b of the second electrode part 260 intersect each other with an outside corner 230, at which the outer edges 251a and 251b intersect each other at an angle of about 90 degrees. The outside recesses 212 are arranged so as to be aligned with the outside corner 230.

The maximum length L by which each of the outside recesses 212 is recessed inward is about 100% the average of the widths of sealed outer edges 222a and 222b, which are adjacent to the outside recess 212.

Here, the maximum length L is a length corresponding to the maximum distance by which each of the outside recesses 212 is recessed inward from the point at which the outer edges 251a and 251b of the electrode parts 250 and 260 intersect each other. The maximum length L is proportional to the sealed area of a sealed extension 270.

The cell case 220 includes sealed outer edges 222a, 222b, 224, 226, and 228 sealed along the outer edges of the electrode assembly 210 in parallel therewith by thermal bonding, excluding the outside recesses 212, and a sealed extension 270 sealed by thermal bonding at a position thereof corresponding to the outside recesses 212.

That is, the battery cell 200 according to the present invention includes a sealed extension 270 further sealed at the position of the cell case 220 corresponding to the outside recesses 212 by thermal bonding so as to have an area corresponding to that of each of the outside recesses 212. Consequently, it is possible to improve the sealability of the outside corner of the electrode assembly 210, which has relatively low sealing force.

In particular, the battery cell 200 has advantages in that the sealed area at the region of the cell case 220 at which the sealed outer edges 222a and 222b, which are adjacent to the outside recesses 212, intersect each other is relatively small due to the sealed extension 270 further sealed at the position of the cell case 220 corresponding to each of the outside recesses 212 and in that the sealed areas of the sealed outer edges 222a and 222b are minimized, whereby the battery cell may maximally utilize the space in a device.

In addition, the sealed outer edges 224 and 228 of the cell case 220, excluding the sealed outer edge 226 of the cell case 220, from which electrode leads 207 and 209 protrude, are bent along reference lines Z and Z' in the lateral direction of the electrode assembly 210.

The sealed outer edges 222a and 222b, which are adjacent to the outside recesses 212, are divided as indicated by reference symbol R in the state in which the sealed outer edges 222a and 222b are cut along a cutting line CL toward the outside recesses 212. The sealed outer edges 222a and 222b divided as described above are bent along reference lines X and Y in the lateral direction of the electrode assembly 210, as shown in FIG. 7.

In the above structure, the sealability of the cell case 220 at the position corresponding to the outside recesses 212 is improved by the sealed extension 270. Even when the connection between the sealed outer edges 222a and 222b is cut, therefore, it is possible to securely maintain the sealed state of the cell case 220 at the position corresponding to the outside recesses 212.

Positive electrode tabs 227 and negative electrode tabs 229 of the electrode assembly are formed at an outer edge of the first electrode part 250 that extends perpendicularly from the outer edge 251a, which defines the outside corner 230. The electrode leads 207 and 209 are coupled to the positive electrode tabs 227 and the negative electrode tabs 229, respectively. The electrode leads 207 and 209 protrude outward from the cell case 220 through the sealed outer edge 226 of the cell case 220.

As shown in FIGS. 3 to 7, each of the outside recesses 212 may have a rounded structure that is constituted by a curved line alone, when viewed from above. Alternatively, each of the outside recesses 212 may have a polygonal structure that is constituted by a plurality of straight lines that are connected to each other, as shown in FIG. 8(a), or each of the outside recesses 212 may have a composite structure that is constituted by a curved line and straight lines that are connected to each other, as shown in FIG. 8(b).

FIGS. 9 to 13 are typical views showing electrode assemblies having various irregular structures according to other embodiments of the present invention.

Referring first to FIG. 9, an electrode assembly 300 includes a first electrode part 350 having a relatively large planar size and a second electrode part 360 having a planar size smaller than that of the first electrode part 350, the second electrode part 360 extending perpendicularly from an imaginary boundary line I that extends from an outer edge 301 of the first electrode part 350 in the state of being integrally formed with the first electrode part 350.

The electrode assembly 300 is provided at a region thereof at which the outer edge 301 of the first electrode part 350 and an outer edge 302 of the second electrode part 360 intersect each other with an outside corner 330, at which the outer edges 301 and 302 intersect each other at an angle θ of about 60 degrees. Outside recesses 312 are arranged so as to be aligned with the outside corner 330.

In the structure of the electrode assembly 300 described above, the second electrode part 360 is inclined with respect to the first electrode part 350. Consequently, the electrode assembly 300 may be easily applied to a device having a curved or rounded structure.

FIG. 10 shows an electrode assembly including a plurality of extension electrode parts.

Referring to FIG. 10, an electrode assembly 400 includes a first electrode part 450 and a second electrode part 460 having relatively large planar sizes and a first extension electrode part 470 and a second extension electrode part 480 having planar sizes smaller than that of the second electrode part 460.

The basic structure of the electrode assembly 400 is similar to that of the electrode assembly shown in FIGS. 2 to 6. However, the first extension electrode part 470 extends perpendicularly from a boundary line I' of the second electrode part 460 in the state of being integrally formed with the second extension electrode part 480, and an outside recess 420 is formed in an outside corner at which the boundary line I' and the first extension electrode part 470 are perpendicular to each other. In addition, the second extension electrode part 480 extends perpendicularly from a boundary line I" of the first extension electrode part 470 in the state of being integrally formed with the first extension electrode part 470 while forming an outside recess 430.

That is, the electrode assembly 400 is configured to have a structure in which the sizes of the first electrode part 450, the second electrode part 460, the first extension electrode part 470, and the second extension electrode part 480 are sequentially decreased, with the result that the electrode assembly 400 includes a plurality of steps 480, 492, and 494, which are formed due to the differences in planar size between the electrode parts.

FIG. 11 typically shows a structure of an electrode assembly in which a first electrode part, second electrode parts, and an extension electrode part are combined with each other.

Specifically, an electrode assembly 500 includes a first electrode part 550 having a relatively large planar size and a pair of second electrode parts 560*a* and 560*b* having planar sizes smaller than that of the first electrode part 550, the second electrode parts 560*a* and 560*b* extending perpendicularly from imaginary boundary lines G and G' that extend from outer edges 551 and 552 of the first electrode part 550.

The second electrode part 560*a* extends perpendicularly from the boundary line G of the first electrode part 550 in the state of being integrally formed with the first electrode part 550, and an outside recess 512 is formed in an outside corner at which the boundary line G and the second electrode part 560*a* are perpendicular to each other.

The second electrode part 560*b* extends perpendicularly from the boundary line G' of the first electrode part 550 in the state of being integrally formed with the first electrode part 550, and an outside recess 513 is formed in an outside corner at which the boundary line G' and the second electrode part 560*b* are perpendicular to each other. An extension electrode part 570 extends perpendicularly from a boundary line G'' of the second electrode part 560*b* so as to face the first electrode part 550, and an outside recess 514 is formed in an outside corner at which the boundary line G'' and the extension electrode part 570 are perpendicular to each other.

This structure is different from those of the electrode assemblies according to the previous embodiments in that a recessed space 580 is defined between the extension electrode part 570 and the first electrode part 550.

In addition, a positive electrode tab 501 and a negative electrode tab 502 of the electrode assembly 500 are formed at the first electrode part 550 and the second electrode part 560*a*, respectively. Consequently, the electrode assembly 500 may be electrically connected to the outside in various directions.

FIGS. 12 and 13 show electrode assemblies, electrode tabs of which are formed at different positions.

Referring first to FIG. 12, the general structure of an electrode assembly 600 is identical to that of the electrode assembly shown in FIGS. 2 to 6 except that a positive electrode tab 601*a* and a negative electrode tab 602*a* are formed at a first electrode part 650 and another positive electrode tab 601*b* and another negative electrode tab 602*b* are formed at a second electrode part 660.

In addition, the electrode tabs 601*a*, 601*b*, 602*a*, and 602*b* are formed at outer edges 651*a* and 652*a* of the electrode parts 650 and 660, excluding outer edges 651 and 652 of the electrode parts 650 and 660 that are adjacent to an outside corner.

In this structure, each electrode part includes a positive electrode tab and a negative electrode tab. Consequently, each of the electrode parts 650 and 660 may be electrically connected to the outside, whereby the electrode assembly 600 may be electrically connected to the outside in various ways. In addition, current may be distributed through the electrode tabs 601*a*, 601*b*, 602*a*, and 602*b* of the first electrode part 650 and the second electrode part 660. Consequently, the resistance in the respective electrode tabs 601*a*, 601*b*, 602*a*, and 602*b* is lowered, with the result that current loss is reduced.

On the other hand, an electrode assembly 700 of FIG. 13 is configured to have a structure in which a positive electrode tab 701 and a negative electrode tab 702 are formed only at a first electrode part 750. In particular, these tabs 701 and 702 are formed at an outer edge 751 of the first electrode part 750 that is adjacent to an outside corner.

In this structure, the positive electrode tab 701 and the negative electrode tab 702 are located at a step 790, which is formed due to the difference in size between the electrode parts. In a battery cell including the electrode assembly 700, an electrical connection member, such as a protection circuit board (PCB), may be mounted in a space defined by the step 790.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery cell according to the present invention is configured such that an electrode assembly includes electrode parts having different shapes and sizes. As a result, the battery cell may be configured to have a new structure quite different from a general rectangular structure. For example, the battery cell may be configured to have an irregular structure such as a stepped or recessed structure based on the difference in size between the electrode parts or a geometrical structure based on the difference in shape between the electrode parts. Consequently, the battery cell according to the present invention may be easily adapted to the shapes of devices having various designs.

In addition, in the battery cell according to the present invention, a cell case is further sealed at a position thereof corresponding to an outside recess by thermal bonding so as to have an area corresponding to that of the outside recess. Consequently, it is possible to improve the sealability of an outside corner of the electrode assembly, which has relatively low sealing force.

The invention claimed is:

1. A plate-shaped battery cell comprising an electrode assembly, which comprises a positive electrode, a negative electrode, and a separator, and a cell case, in which the electrode assembly is mounted, outer edges of the cell case being sealed by thermal bonding, wherein the electrode assembly is configured such that each electrode plate having the same polarity is partitioned into at least two electrode parts having different planar shapes and sizes such that each of the at least two electrode parts has an outer edge that intersect each other at an angle of 30 to 150 degrees to provide at least one outside corner for the electrode plate, and, in each electrode plate, the at least two electrode parts are coplanar, the electrode assembly is provided such that the at least one outside corner for all the electrode plates are aligned, and an outside recess is formed in each of the electrode plates in place of the intersection of the outer edge of each of the at least two electrode parts and the separator so as to be recessed inward at the at least one outside corner for all of the electrode plates.

2. The battery cell according to claim 1, wherein the cell case is further sealed at a position thereof corresponding to the outside recess by thermal bonding so as to have an area corresponding to an area of the outside recess.

3. The battery cell according to claim 2, wherein the cell case comprises:
    sealed outer edges sealed along outer edges of the electrode assembly in parallel therewith by thermal bonding, excluding the outside recess; and
    a sealed extension sealed by thermal bonding at a position thereof corresponding to the outside recess.

4. The battery cell according to claim 3, wherein the sealed outer edges of the battery cell are bent relative to a plane in which the electrode assembly extends.

5. The battery cell according to claim 4, wherein the sealed outer edges adjacent to the outside recess, among the bent sealed outer edges, are bent in a state in which a connection between the sealed outer edges is cut toward the sealed extension.

6. The battery cell according to claim 3, wherein a maximum length by which the outside recess is recessed inward is 20 to 400% an average of widths of the sealed outer edges adjacent to the outside recess.

7. The battery cell according to claim 1, wherein, when viewed from above, the outside recess has:
    a rounded structure comprising a curved line;
    a composite structure comprising a curved line and a straight line connected to each other; or
    a polygonal structure comprising a plurality of straight lines connected to each other.

8. The battery cell according to claim 1, wherein, at the outside corner, the outer edges of the electrode parts intersect each other at an angle of 60 to 120 degrees.

9. The battery cell according to claim 1, wherein the electrode assembly comprises:
    a first electrode part having a relatively large planar size; and
    at least one second electrode part having a planar size smaller than the planar size of the first electrode part, the second electrode part extending perpendicularly from a boundary line of the first electrode part in a state of being integrally formed with the first electrode part, and wherein
    the outside recess is formed in an outside corner at which the boundary line of the first electrode part and an extension region of the second electrode part are perpendicular to each other.

10. The battery cell according to claim 9, wherein one electrode tab is formed at each of the first electrode part and the second electrode part.

11. The battery cell according to claim 9, wherein electrode tabs are formed at each of the first electrode part and the second electrode part, and the electrode tabs are formed at the outer edges of the electrode parts, excluding the outer edges of the electrode parts that are adjacent to the outer corner.

12. The battery cell according to claim 9, wherein electrode tabs are formed at the first electrode part or the second electrode part, and the electrode tabs are formed at the outer edges of the electrode part, excluding the outer edges of the electrode part that are adjacent to the outer corner.

13. The battery cell according to claim 9, wherein electrode tabs are formed at the first electrode part or the second electrode part, and the electrode tabs are formed at the outer edges of the electrode part that are adjacent to the outer corner.

14. The battery cell according to claim 9, wherein
    the electrode assembly further comprises n (n≥1) extension electrode parts having planar sizes smaller than the planar size of the first electrode part or the second electrode part,
    a first extension part of the extension electrode parts extends perpendicularly from a boundary line of the first electrode part or the second electrode part in a state of being integrally formed with the first electrode part or the second electrode part, and
    an outside recess is formed in an outside corner at which the boundary line and the first extension electrode part are perpendicular to each other.

15. The battery cell according to claim 14, wherein, when n is equal to or greater than 2, the extension electrode parts extend perpendicularly from a boundary line of an adjacent (n−1)-th extension electrode part in a state of being integrally formed with the (n−1)-th extension electrode part while forming an outside recess.

16. The battery cell according to claim 1, wherein the electrode assembly is configured to have a structure in which at least one positive electrode plate comprising electrode parts and an outside recess and at least one negative electrode plate comprising electrode parts and an outside recess are stacked upward in a state in which a separator is disposed between the positive electrode plate and the negative electrode plate.

17. The battery cell according to claim 1, wherein the electrode assembly is configured to have a structure in which a plurality of unit cells, each of which is configured to have a structure in which at least one positive electrode plate comprising electrode parts and an outside recess and at least one negative electrode plate comprising electrode parts and an outside recess are stacked upward in a state in which a separator is disposed between the positive electrode plate and the negative electrode plate, is arranged on a separation film, the separation film being wound from one end to the other end thereof such that the unit cells are stacked in a state in which the separation film is disposed between the respective unit cells.

18. The battery cell according to claim 1, wherein the battery cell is configured to have a structure in which electrode leads protrude outward from the cell case through portions of the outer edges of the cell case sealed by thermal bonding in a state in which the electrode leads are coupled to electrode tabs of the electrode assembly.

19. The battery cell according to claim 1, wherein
    the battery cell is an irregular battery cell configured to have a structure in which six or more outer edges of the battery cell are connected so as to define one or more steps when viewed from above, and
    the outer edges of the battery cell correspond to the outer edges of the cell case sealed by thermal bonding.

20. A battery pack comprising one or more battery cells according to claim 1.

* * * * *